US008440958B2

(12) United States Patent
Bandyopadhyay (10) Patent No.: US 8,440,958 B2
(45) Date of Patent: May 14, 2013

(54) PHOTO-RECEPTOR FOR ELECTRO-MAGNETIC RADIATION COLLECTION

(75) Inventor: Promode R. Bandyopadhyay, Middletown, RI (US)

(73) Assignee: The United States of America as represented by the Secretary of the Navy

( * ) Notice: Subject to any disclaimer, the term of this patent is extended or adjusted under 35 U.S.C. 154(b) by 126 days.

(21) Appl. No.: 13/161,912

(22) Filed: Jun. 16, 2011

(65) Prior Publication Data

US 2011/0253971 A1   Oct. 20, 2011

Related U.S. Application Data

(62) Division of application No. 12/114,193, filed on May 2, 2008, now Pat. No. 8,045,859.

(51) Int. Cl.
*G01N 27/00* (2006.01)
*H01L 31/0232* (2006.01)
*B82Y 20/00* (2011.01)

(52) U.S. Cl.
USPC ......... 250/214.1; 257/432; 977/742; 977/954

(58) Field of Classification Search ............... 250/214.1, 250/214 R; 257/428, 431, 432, 351; 977/734, 977/742–749, 932, 953, 954
See application file for complete search history.

(56) References Cited

U.S. PATENT DOCUMENTS

| | | | | |
|---|---|---|---|---|
| 5,038,406 A * | 8/1991 | Titterton et al. | | 398/125 |
| 5,539,562 A * | 7/1996 | Morioka et al. | | 398/131 |
| 5,969,321 A * | 10/1999 | Danielson et al. | | 235/462.01 |
| 5,999,249 A * | 12/1999 | Ito et al. | | 356/3.07 |
| 6,108,089 A * | 8/2000 | Shiraishi | | 356/615 |
| 6,137,609 A * | 10/2000 | Scheps | | 398/125 |
| 6,693,561 B2 * | 2/2004 | Kaplan | | 340/984 |
| 6,946,851 B2 * | 9/2005 | Lee et al. | | 324/658 |
| 6,995,367 B2 * | 2/2006 | Miyamoto | | 250/306 |
| 6,999,175 B2 * | 2/2006 | Ivarsson | | 356/445 |
| 7,335,408 B2 * | 2/2008 | Kyotani et al. | | 428/34.1 |
| 7,415,211 B2 * | 8/2008 | Feinberg et al. | | 398/104 |
| 7,452,452 B2 * | 11/2008 | Ren et al. | | 204/400 |
| 7,469,104 B2 * | 12/2008 | Neubelt | | 398/104 |
| 7,502,537 B2 * | 3/2009 | Kurahashi | | 385/118 |
| 7,521,225 B2 * | 4/2009 | Smirnov | | 435/287.1 |
| 7,565,082 B2 * | 7/2009 | Yazaki et al. | | 398/129 |
| 7,574,140 B2 * | 8/2009 | Manna et al. | | 398/105 |
| 7,598,482 B1 * | 10/2009 | Verhulst et al. | | 250/214.1 |
| 7,646,494 B2 * | 1/2010 | Lechuga Gomez et al. | | 356/622 |
| 7,701,590 B2 * | 4/2010 | Kiesel et al. | | 356/519 |

(Continued)

*Primary Examiner* — John Lee (74) *Attorney, Agent, or Firm* — James M. Kasischke; Michael P. Stanley; Jean-Paul A. Nasser (57) ABSTRACT

An underwater data transmission system including arrays of nano-meter scaled photon emitters and sensors on an outer surface of an underwater platform. For the emitters, a laser is pulsed to correlate with data packets, providing a beam of photons at a prescribed frequency. Nano-scaled collecting lenses channel the incoming photons to photo-receptors located at a focal plane for the frequency at the base of each lens. A coating on the lenses absorbs photons at the frequency that are not aligned with the longitudinal axes of the lenses or tubes. Nano-wires connect the photo-receptors to a light intensity integrator. The integrator integrates the intensity over a surface area. The output of the integrator is fed to a signal processor to track and process the arriving digital packets.

5 Claims, 11 Drawing Sheets

U.S. PATENT DOCUMENTS

| | | | |
|---|---|---|---|
| 7,785,669 B2* | 8/2010 | Wang et al. ................... 427/369 |
| 7,939,024 B2* | 5/2011 | Brongersma et al. ........... 422/98 |
| 8,013,988 B2* | 9/2011 | Xiao et al. .................... 356/218 |
| 8,030,729 B2* | 10/2011 | Quitoriano et al. ........... 257/461 |
| 8,045,859 B2* | 10/2011 | Bandyopadhyay ........... 398/104 |
| 8,232,517 B2* | 7/2012 | Verhulst et al. ............ 250/214.1 |
| 8,295,708 B2* | 10/2012 | Bandyopadhyay ........... 398/131 |
| 2002/0057477 A1* | 5/2002 | Rocca et al. .................. 359/141 |
| 2002/0080447 A1* | 6/2002 | Fells et al. .................... 359/141 |
| 2005/0019040 A1* | 1/2005 | Trutna .......................... 398/183 |
| 2007/0154219 A1* | 7/2007 | Feinberg ...................... 398/104 |
| 2007/0252973 A1* | 11/2007 | Guldevall .................... 356/4.07 |
| 2008/0218740 A1* | 9/2008 | Williams et al. ................ 356/72 |
| 2008/0318245 A1* | 12/2008 | Smirnov ........................ 435/7.1 |
| 2009/0121136 A1* | 5/2009 | Gruss et al. ................ 250/336.1 |
| 2009/0189144 A1* | 7/2009 | Quitoriano et al. ............. 257/12 |
| 2009/0274465 A1* | 11/2009 | Bandyopadhyay ........... 398/104 |
| 2009/0278556 A1* | 11/2009 | Man et al. ..................... 324/693 |
| 2009/0321620 A1* | 12/2009 | Hillis et al. ............... 250/227.23 |
| 2010/0078055 A1* | 4/2010 | Vidu et al. .................... 136/244 |
| 2010/0083489 A1* | 4/2010 | Eldridge et al. ................ 29/825 |
| 2010/0142017 A1* | 6/2010 | Stevens ........................ 359/108 |
| 2010/0331202 A1* | 12/2010 | Smirnov ........................... 506/9 |
| 2011/0086987 A1* | 4/2011 | Sample et al. ................ 525/420 |
| 2011/0243564 A1* | 10/2011 | Bandyopadhyay ........... 398/104 |
| 2011/0253971 A1* | 10/2011 | Bandyopadhyay ............... 257/9 |
| 2011/0293218 A1* | 12/2011 | Pettit ............................... 385/16 |
| 2011/0304600 A1* | 12/2011 | Yoshida ........................ 345/207 |
| 2012/0037789 A1* | 2/2012 | Tian et al. .................. 250/208.1 |

\* cited by examiner

PHOTO-RECEPTOR FOR ELECTRO-MAGNETIC RADIATION COLLECTION

This application is a divisional of pending prior U.S. patent application Ser. No. 12/114,193 filed on May 2, 2008 now U.S. Pat. No. 8,045,859 and claims the benefit under 35 U.S.C. §121 of the prior application's filing date.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to underwater communications and more specifically to a high-speed underwater data transmission system and method of utilizing arrays of nanometer scaled photon emitters and sensors.

(2) Description of the Prior Art

There exists a need for enhancing underwater data transmission rates, especially in the area of underwater environmental and situational awareness. Developmental plans envision platforms and data centers as being part of a network, with vast amounts of time-varying information being exchanged among the data cells or centers and built-in redundancy for providing robust systems. Arrays of autonomous platforms can be envisaged to work in herds that share information. These emerging systems can reach their full potential only if underwater data transmission rates improve.

On land, in air and in space, data transmissions have reached high rates due to the availability of earth orbiting satellites and fiber optic cables and lasers. The data transmission typically reaches or exceeds rates of 100 Megabits/second (Mbits/s).

In comparison, underwater communications have been described as primitive, with underwater transmission rates based on sound waves being approximately 56 kilobits/second (kbps).

Typically, transducers (called hydrophones) are used to transmit sound waves. However, the sound waves are transmitted in all directions, and reflect from the sea floor, the surface and interfere with one another, thereby garbling the acoustic waves. As such, sophisticated signal processing techniques are required to provide stable and secured acoustic communication. A different approach to underwater communication is needed if underwater data transmission rates are to be similar to those of fiber optic cable.

SUMMARY OF THE INVENTION

It is therefore a general purpose and primary object of the present invention to provide a communication system and method of use in underwater environments in which the system provides enhanced data transmission rates.

The object of the present invention is attained by providing one or more arrays of nanometer-scaled photon emitters and sensors on an outer surface of an underwater platform. The emitters and sensors are lensed to send and receive single photons at precise frequencies.

For the emitters, a laser, pulsed to correlate with the data packets, provides a coherent collimated beam of photons at a prescribed frequency. The sensors include a plurality of nano-scale collecting lenses or tubes having interior pigment coatings to absorb photons. The coating of each lens or tube absorbs photons that are not aligned with the longitudinal axes of the lens or tube. A photo-receptor is located at the focal plane for the prescribed light frequency at the base of each lens or tube.

Nano-wires connect the photo-receptors to a light intensity integrator. Each nano-wire has a plurality of atoms per unit cell to provide for redundant conductance channels in case of defects. The light intensity integrator integrates the light intensity over a given surface area. The output of the light intensity integrator is fed to an intensity-time signal processor to track and process the arriving digital packets.

In one embodiment, a system for underwater data transmission comprises a photon source providing a beam of electromagnetic radiation at a predetermined frequency, the beam being pulsed to encode the data; an array of photo-receptors configured to collect electromagnetic radiation of the predetermined frequency; at least one integrator in communication with a plurality of photo-receptors of the array of photo-receptors, the integrator receiving signals from said plurality of photo-receptors corresponding to an intensity of electromagnetic radiation collected by the plurality of photo-receptors and integrating the intensity over the plurality of photo-receptors; and a signal processor in communication with the integrator, the signal processor receiving signals from the integrator corresponding to the integrated intensity and determining the transmitted data based on an intensity-time track of the integrated intensity for the pulsed beam of electromagnetic radiation at the predetermined frequency.

In one variation, each photo-receptor comprises an elongated collecting lens having an optical opening therein to collect electromagnetic radiation in a direction aligned with a longitudinal axis of the opening. A coating on an interior surface of the opening absorbs electromagnetic radiation of the predetermined frequency. The lens may be a carbon nanotube.

Each photo-receptor may comprise a nano-scale photo-receptor spaced apart from the lens a distance corresponding to a focal plane for the electromagnetic radiation of the predetermined frequency. A nano-scale photo-receptor may comprise at least one sensing molecule selected to emit at least one electron upon absorbing electromagnetic radiation of the predetermined frequency. A plurality of nano-wires connected to the nano-scale photo-receptor and the integrator may transmit the electrons to the integrator. A protective coating may cover the front surface of the photo-receptors such that the electromagnetic radiation passes through the protective coating prior to entering the photo-receptors. A protective coating may also cover the rear surface of the photo-receptors remote from the front surface.

In another variation, portions of the array of photo-receptors are activated in a sequence, such that the signal processor can determine a direction of the pulsed beam based on which portion of the array has a maximum intensity for the pulsed beam. In a further variation, the system comprises attitude sensors and alignment mirrors at both the photon source and photo-receptors, such that the positions of the alignment mirrors are controlled by the attitude sensors to maintain alignment of the pulsed beam between the photon source and the photo-receptors.

In one embodiment, a photo-receptor collects electromagnetic radiation of a predetermined frequency. The photo-receptor includes a carbon nano-tube collecting lens to collect electromagnetic radiation in a direction aligned with a longitudinal axis of the lens, a coating on an interior surface of the lens to absorb electromagnetic radiation of the predetermined frequency and a nano-scale photo-receptor spaced apart from the lens a distance corresponding to a focal plane for the electromagnetic radiation. At least one sensing molecule of the nano-scale photo-receptor is selected so as to emit one or more electrons upon absorbing the electromagnetic radiation.

In one variation, the photo-receptor includes a plurality of nano-wires connected to said nano-scale photo-receptor and said integrator for transmitting the electrons to an integrator for integrating intensities of electromagnetic radiation of the predetermined frequency collected over a plurality of photo-receptors. A first protective coating may cover the collecting lens in a plane perpendicular to the longitudinal axis such that the electromagnetic radiation passes through said protective coating prior to entering the collecting lens. The coating can be transparent to the electromagnetic radiation of the predetermined frequency. A protective coating may also cover a rear surface of the photo-receptors remote from the first protective coating.

In one embodiment, a method determines a direction of a signal source arriving at an array of photo-receptors. The signal source includes a photon beam of a predetermined frequency and the photo-receptors collect photons of the predetermined frequency from a direction aligned with the photo-receptors. The beam is pulsed to encode data. The method includes activating one portion of the array of photo-receptors comprising a plurality of contiguous photo-receptors, determining, over a time period, an intensity of photons collected by the activated portion corresponding to pulses of photons, sequentially activating overlapping portions of the array of photo-receptors and determining intensities, integrating the intensities over the array to determine the overlapping portion or portions having the peak intensities and performing a limited activation sequence about the overlapping portions of peak intensities to refine the direction of the signal source.

In yet another variation of the present invention, the method includes coordinating results for peak intensities from a plurality of arrays and re-orienting the plurality of arrays to enhance the peak intensities based on the coordinated results.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
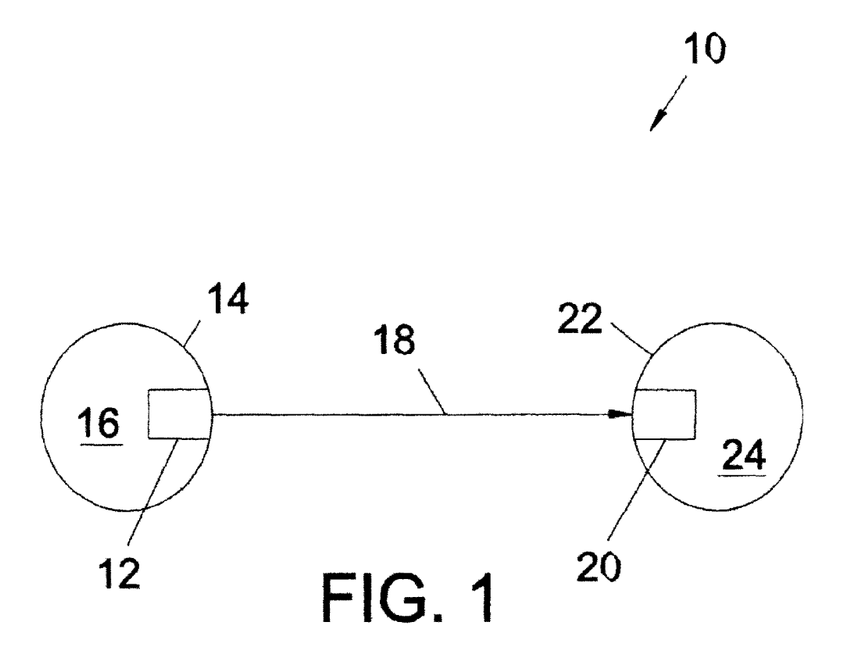
FIG. 1 shows a schematic of an underwater data communication system of the present invention.

Referring now to FIG. 1, there is shown a schematic of a system 10 for underwater data communication or transmission. A coherent collimated laser source 12 positioned on an outer surface 14 of an underwater emitter platform 16 emits a photon beam 18 to a photo-receptor 20 on an outer surface 22 of an underwater receiver platform 24. The photon or laser beam 18 is pulsed to form data packets in the manner of fiber optic light data communications known to those ordinarily skilled in the art. The frequency of laser beam 18 is predetermined between the emitter 16 and the receiver platform 24. All other frequencies are identified as noise and are un-correlated. The frequency may be chosen to minimize the absorption of the laser beam 18 as the beam travels through the intervening medium from the emitter 16 to the receiver 24. For purposes of discussion and illustration of communications in sea water, the laser source 12 preferably emits blue light at 475 nano-meters (nm), since the absorption of blue light in sea water is known to be low. However, other frequencies of electro-magnetic radiation may be contemplated, without limitation.

At this point, discussion of bio-sensors provides a further understanding of the operation and feasibility of the system 10. The response dynamics of a retina of a living organism match the habitat and lifestyle of the organism, both in oceanic and terrestrial environments. Research exists on the spatial and temporal visual sensitivities of organisms that can be applied to data communication between underwater platforms. As is known to those of skill in the art, temporal sensitivity is measured by Flicker Fusion Frequency (FFF). FFF is low for night active organisms (10-60 Hz), while FFF is higher for rapidly moving and day active species (200-300 Hz). Spatial resolution is known to be more dependent on temporal properties of the photo-receptor cells than on the structural optics of the eye. Therefore, for an underwater system of vision for data communication, both spatial and temporal properties of the photo-receptor cells should be taken into account.

Deep-sea animals have evolved to perceive bioluminescent flashes at distances of 100-200 meters (m) and do not use scant downwelling sun light. The intensity of typical bioluminescent flashes varies between $10^{-11}$ and $10^{-7}$ W m$^{-2}$ at a distance of 1 m. Such a bioluminescent blue source ($\lambda$=475 nm) would produce approximately $3\times10^8$ to about $1\times10^{12}$ photons every second. For reference, such a flash is about one tenth of a 1 milliwatt (mW) blue laser operating at 0.1% efficiency in photon count. Flashes are typically between 0.2-5.0 seconds long. The total number of photons, E, in one flash would range between $6\times10^7$ photons for a dim short flash to approximately $2\times10^{13}$ photons for a bright and long flash.

The number of photons, N, from a flash containing photons, E, that enter an eye of pupil diameter, A, at a distance, r, from the flash is known to be:

$$N = \frac{EA^2}{16r^2}e^{-ar}, \qquad (1)$$

where the exponential term describes flash attenuation due to scattering and absorption by water and α is the attenuation coefficient, $\alpha=0.05$ m$^{-1}$.

It has been found that a deep-sea fish needs about five photons for threshold perception of a blue flash. If the pupil diameter is 7.3±3.7 mm, flash intensity is $10^{10}$ photons, N=5 photons and $\alpha=0.05$ m$^{-1}$, then the maximum distance, r, at which the flash can be perceived is about 34 m. For a brighter flash, the largest fish pupil has a maximum range of visibility of about 150 m. While larger eyes would allow an underwater organism to perceive a bioluminescent flash, i.e., detect prey, at a greater distance, the evolution of fish vision is also related to swimming speed. For distances greater than about 150 m, the survival advantage conferred to an organism by having greater distance perception of a bioluminescent flash is limited as it would take too long for the organism to travel to the target.

However, for the system 10, the receiver can be sized to suit design requirements. For illustration purposes, but not limitation, the eye pupil diameter of the photo-receptor 20 can be taken at 10 m. Using Equation (1) and holding the other parameters the same as provided above, the range, r, for a pupil diameter of 10 m is about 167 m for a dim bioluminescent flash ($10^8$ photons/second) and 366 m for a bright bioluminescent flash ($10^{13}$ photons/second). This range corresponds to a littoral area of interest for satellite-ship-sub communications.

A coherent and collimated laser source, such as the laser source 12 of FIG. 1, is more suitable for communications than for a bioluminescent source. For illustrative purposes, but not limitation, a 1 Watt (W) blue laser (475 nm) can be considered. The number of photons emitted by such a laser operating at 100% efficiency can be determined to be about 2.4 e$^{19}$, based on: N=P/(hc/λ), where P is power in watts, h is Plancks' constant and c is the speed of light. For a 1 mW laser, the number of photons would be about 2.4e$^{16}$. Using Equation (1), range estimations for 1 W and 1 mW blue lasers of more practical efficiencies of 0.10%, 1%, 10% and 30% are shown in Table 1 and Table 2. Again, a minimum photon count of 5 is used. Two detection area diameters are considered, 1 meter (m) and 1 millimeter (mm).

TABLE 1

Detection range estimation in meters for emissions from 1 W and 1 mW laser sources; detection sensor diameter is 1 m.

| Laser Power | Efficiencies 0.10% | 1% | 10% | 30% |
|---|---|---|---|---|
| 1 W | 425 | 467 | 510 | 530 |
| 1 mW | 300 | 341 | 383 | 403 |

TABLE 2

Detection range estimation in meters for emissions from 1 W and 1 mW laser sources; detection sensor diameter is 1 mm.

| Laser Power | Efficiencies 0.10% | 1% | 10% | 30% |
|---|---|---|---|---|
| 1 W | 182 | 220 | 260 | 278 |
| 1 mW | 78 | 110 | 145 | 162 |

The above estimations suggest that high bandwidth data communication is theoretically possible at distances of 78 m to up to 530 m, depending on laser efficiency, laser power and sensor detection area. As previously noted, this range is of interest for communications in acoustically and optically disturbed shallow water areas, also referred herein as littoral areas. Thus, in a worst case, a 1 mW laser source 12, operating at 0.1% efficiency and emitting from the skin or the outer surface 14 of the emitter platform 16, such as a manned or unmanned, underwater vehicle (UUV) would be detectable with 1 mm diameter sensors or photo-receptors in the depth/distance range of 78 m. Such laser and sensor scales are well-suited to nano, micro and laser technologies.

Figure 2:
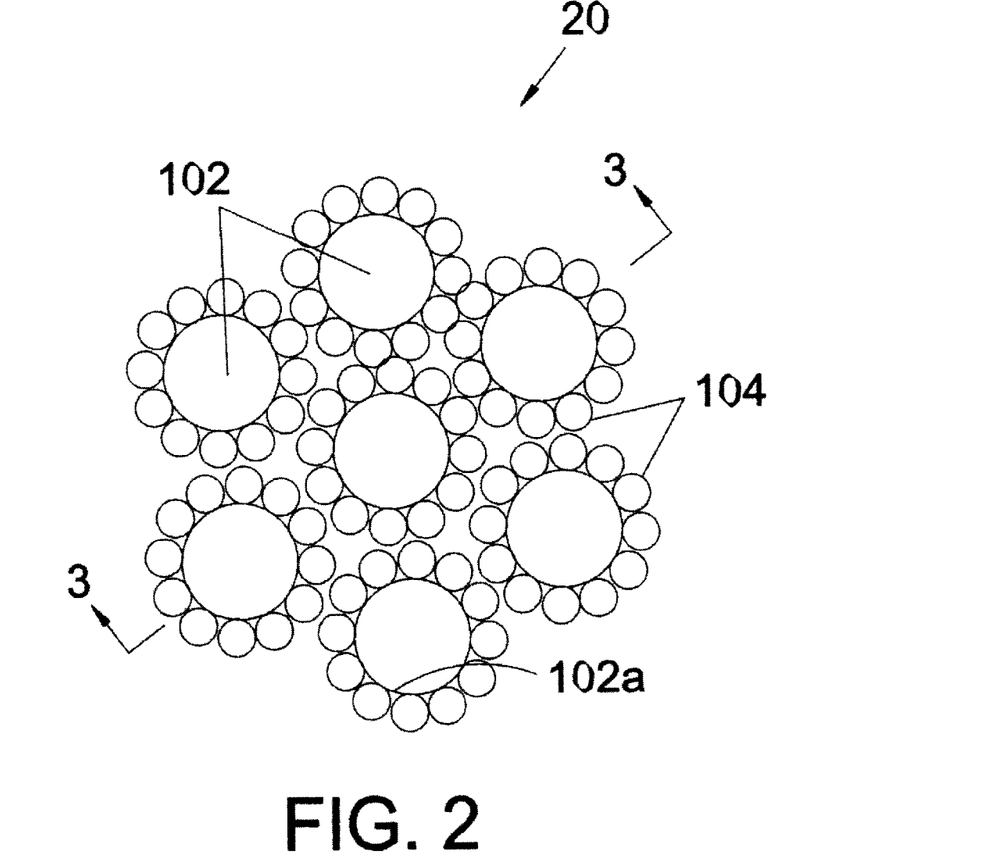
FIG. 2 shows a planar top view of photo-receptors for the system of FIG. 1.

Referring to FIG. 2, there is illustrated a top planar view of a portion of the outer surface 22 of receiver 24, showing photo-receptors 20 of FIG. 1. Consider a blue laser beam reaching the skin or the outer surface 22 of the receiver 24. The photo-receptors 20 comprise dense clusters of nano-scale collecting lens 102. A portion of a cluster is shown in FIG. 2 in a hexagonal configuration of lenses 102 for illustration and not limitation and other packing configurations are possible. Each lens 102 can be fabricated from a carbon nano-tube 102a with a pigment coating 104 to prevent the exemplary blue light from escaping circumferentially.

Figure 3:
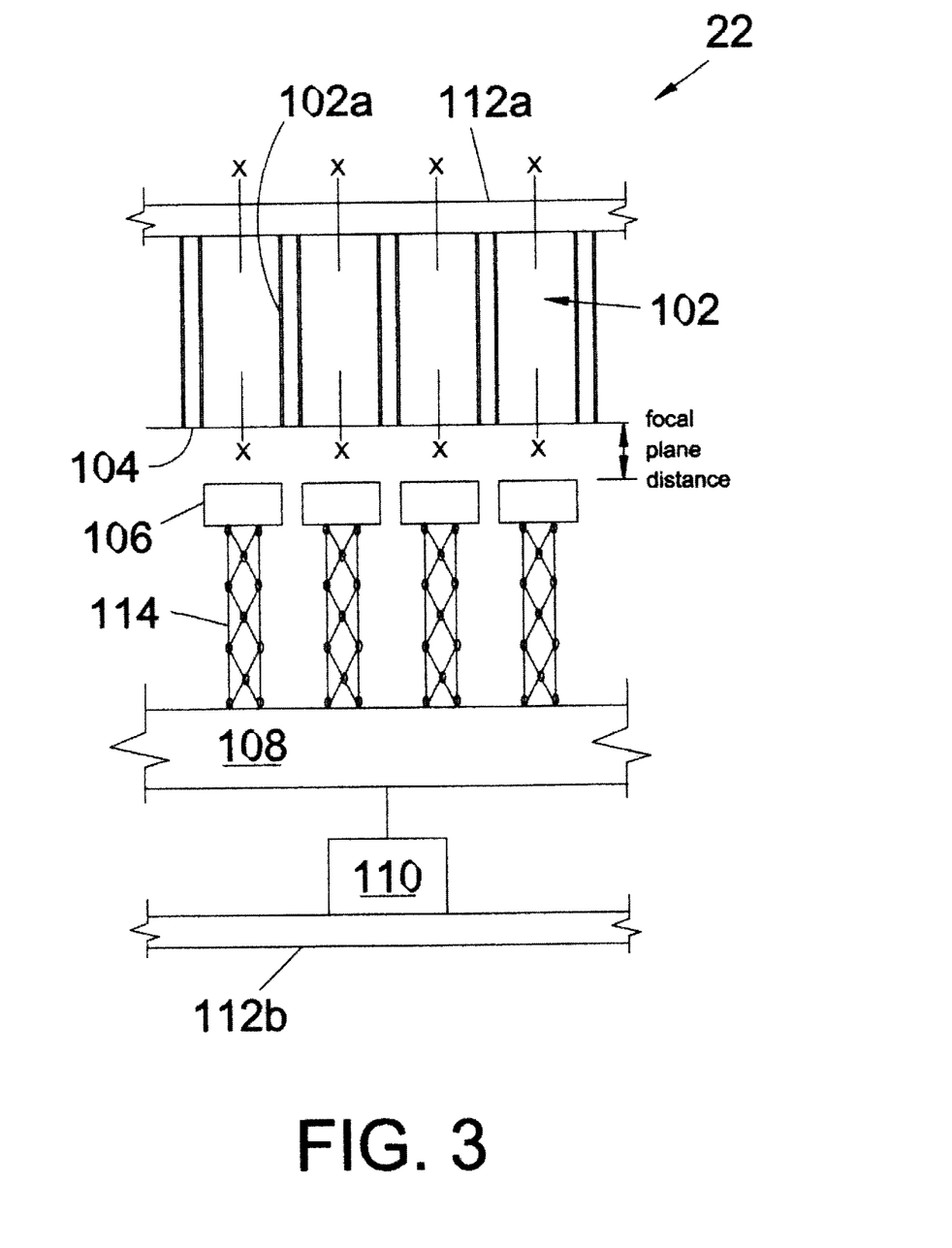
FIG. 3 shows a cross-sectional view of the photo-receptors of FIG. 2.

Referring to FIG. 3, a cross-sectional view of the surface 22 of FIG. 2 taken at line 3-3 of FIG. 2 is illustrated. In the cross-section, the outer surface 22 comprises the collecting lenses 102, nano-scale photo-receptors 106, light intensity integrators 108 and signal processors 110. As in FIG. 2, pigment coating 104 on carbon nano-tube 102a can prevent the exemplary blue light from escaping circumferentially. In this manner, photons along longitudinal axes X-X of lenses 102 are preferentially collected.

Compared to other photo-receptive systems, the assembly of optical and opto-electronic subsystems as further described herein may reduce the number of electronic components while increasing optical performance, thereby minimizing electronic resistance, losses and noise. The photo-receptor clusters are sandwiched between protective coatings 112a and 112b. The protective coatings 112a and 112b are coating materials that can be sprayed on after assembly of the subsystem of the collecting lenses 102, nano-scale photo-receptors 106, light intensity integrators 108 and signal processors 110 so as to provide transparent, scratch resistant and flexible nanoscale thickness coatings. For illustration and not limitation, the total sandwich thickness of the outer surface 22 may be in the range of 1 mm. Additionally, the integrators 108, the processors 110, or both, may be encompassed between the coatings 112a and 112b, as illustrated in FIG. 3, or may be an outside protective coating 112b.

The nano-scale photo-receptors 106 in FIG. 3 are located a distance from the collecting lens 102 corresponding to the focal plane of the wavelength of the incoming laser light, so as to provide preferential collection of the photons of interest. For the exemplary blue lasers, the photo-receptors 106 are located at the focal plane of 465 nm light. Each nano-scale photo-receptor 106 converts received photons to electrons, which travel down atomic length, conductive nano-wires 114 to the light intensity integrator 108. Preferentially, the nano-wires 114 have multiple numbers of atoms per unit cell, e.g., four or more atoms, to allow for redundancy in case of fabrication defects.

The light intensity integrator 108 integrates the light intensity over a given surface area of the outer surface 22, or number of the nano-scale photo-receptors 106. The output of the integrator 108 is fed to signal processor 110 to track the digital photon packets arriving. Signal processor 110 can be configured to process intensity-time variations of the output of the integrator 108, as will be explained in further detail herein. The fabrication and operation of the photo-receptors 106, the integrator 108 and the signal processor 110 may be based on currently available technologies. The light intensity integrators 108 may be similar to known charge-coupled device (CCD) integrators.

Figure 4:
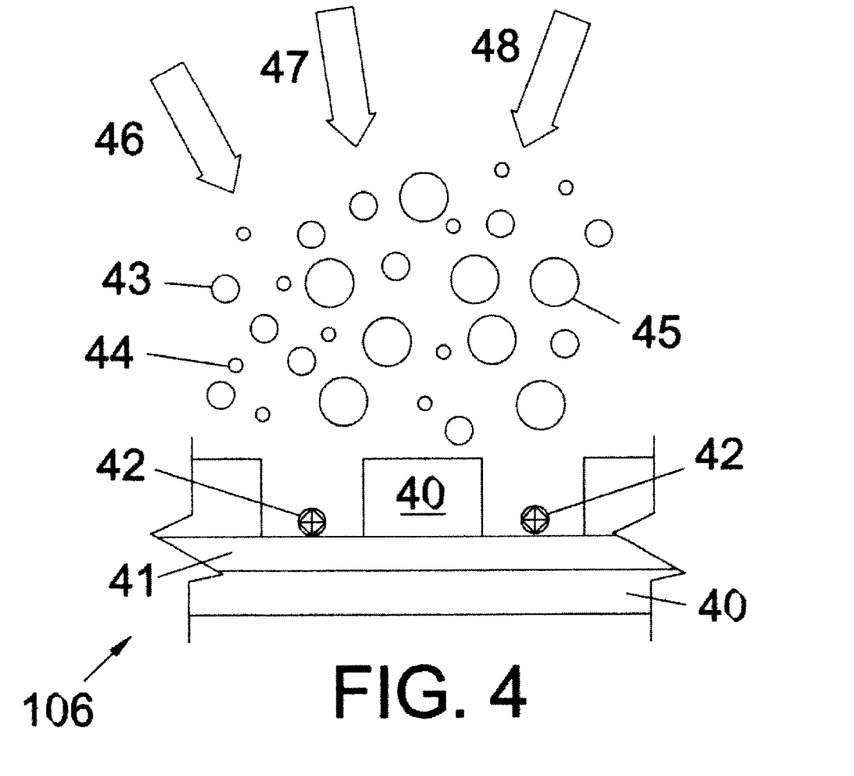
FIG. 4 illustrates incoming streams of photons arriving at the photo-receptors of FIG. 2 and FIG. 3.
Figure 5:
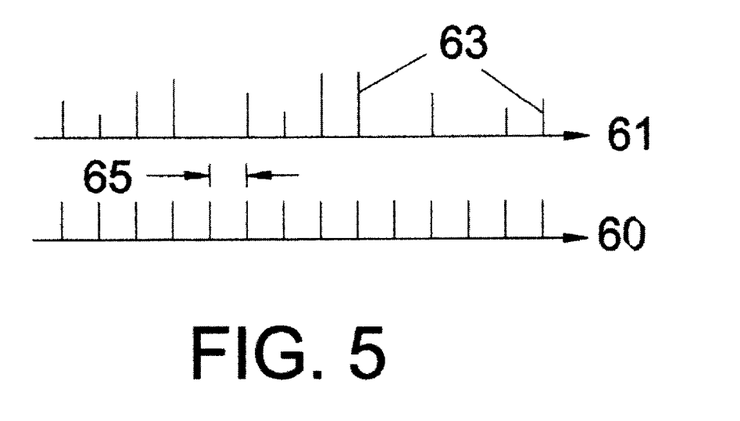
FIG. 5 shows an intensity-time trace of photons detected by the photo-receptors of FIG. 2 and FIG. 3 compared with an atomic clock trace.

The working principle of the present invention is shown in FIG. 4 through FIG. 7. FIG. 4 illustrates incoming streams 46-48 of photons (49) of various colors of lights (illustrated as differing sizes) arriving at the nano-scale photo-receptor 106, but in an incoherent time stream (FIG. 5). In FIG. 4, the nano-scale photo-receptor 106 comprises silicon (Si) substrates 40, conducting substrate 41 and sensing molecules 42. The sensing molecules 42 are sensitive to the frequency of coherent light selected for communication. For the exemplary blue light, the molecules 42 are sensitive to 475 nm blue light.

In the example of FIG. 4, only some of the photons are 475 nm blue light, which arrive from scattered light and not from a definite 'point' source, such as the emitter platform 16. Additionally, the stream lacks any pre-determined stream of deterministic data packets to broadcast that a 'friend' is trying to make contact sitting at a precise range. This leads to an intensity-time signature shown in upper trace 61 of FIG. 5. For comparison, a high-resolution (65) of an atomic clock trace 60 is shown below the upper trace 61. The intensities (63) of upper trace 61 are non-uniform and appear randomly in time sequence.

Figure 6:
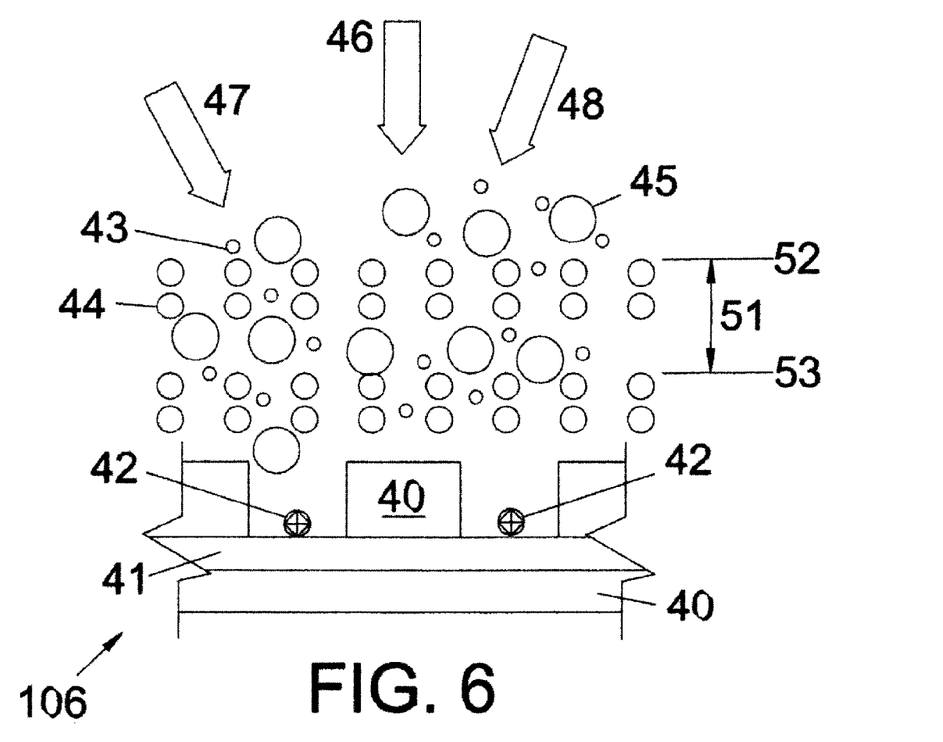
FIG. 6 illustrates a deterministic stream of photons submerged in otherwise scattered photons arriving at the photo-receptors of FIG. 2 and FIG. 3.
Figure 7:
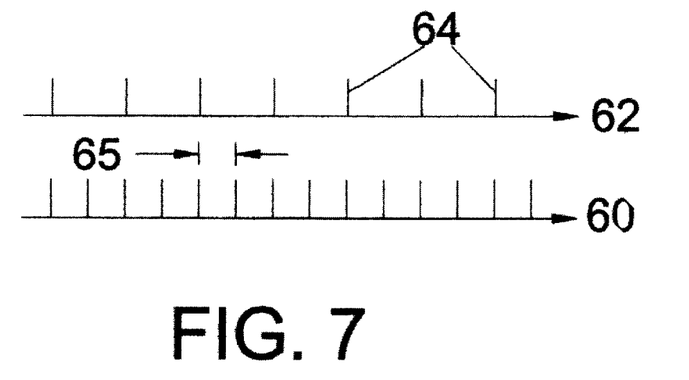
FIG. 7 shows an intensity-time trace of the deterministic stream of photons of FIG. 6 compared with an atomic clock trace.

On the other hand, as shown in FIG. 6 and FIG. 7, a communication from a 'friend' results in the deterministic incoming stream 46 of blue photons 44 submerged in the noise of the background of scattered lights (the streams 47 and 48; photons 50). In FIG. 6, the photons 44 arrive in packets 52 and 53, with a time interval 51 between the packets. Such packets, having intensities 64 and their arrival times as shown on trace 62 of FIG. 7, can provide meaningful information.

Figure 8:
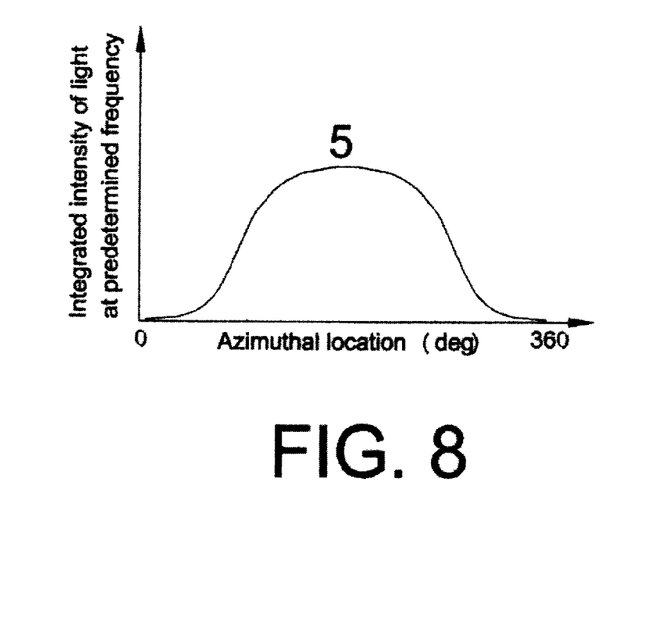
FIG. 8 is a plot of the variation of light intensity integrated over an area of photo-receptors.
Figure 9:
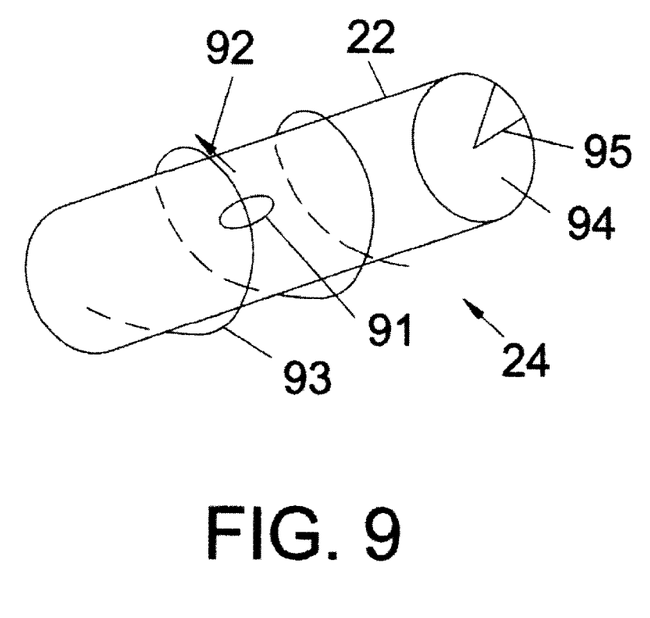
FIG. 9 illustrates an activation sequence of the photo-receptors that are utilized in obtaining the plot shown in FIG. 8.

FIG. 8 illustrates how the presence of a 'friend' for purpose of this description is ascertained. The variation of light intensity integrated over a moving active zone of photo-receptors 20 on outer surface 22 (FIG. 1 and FIG. 3) is shown. When the active zone of the outer surface 22 is aligned with the source ('friend'), the light intensity at the exemplary 475 nm wavelength would be the maximum, as illustrated by peak 5 of the plot of FIG. 8. FIG. 9 illustrates an activation sequence that may be utilized in obtaining the plot shown in FIG. 8. The receiver platform 24 is illustrated as a cylindrical body, such as the main body of a manned vehicle or an unmanned undersea vehicle (UUV), covered with the outer surface 22.

To determine the direction of a source, as by the plot of FIG. 8, areas of the nano-scale photo-receptors 106 (FIG. 3), such as exemplary area 91 of FIG. 9, are activated in sequence. The sequence of activation is that of a spiraling scan, as shown by track 93, which progresses in the direction of arrow 92.

Other activation sequences and configurations of the exemplary area 91 may be contemplated, without limitation. For example, a longitudinal span of nano-scale photo-receptors may be activated and progress circumferentially about the cylindrical body. As each area is activated in the selected sequence, the intensity of the incoming electro-magnetic radiation of interest is determined as illustrated in FIG. 6 and FIG. 7. Integrating these intensity readings results in a plot, such as that of FIG. 8. Once the general location of a peak intensity is determined, a limited activation sequence about the general location using a reduced area of activated nano-scale photo-receptors can be performed to further refine the direction of a source. A similar activation sequence can be utilized for the laser sources 12 of the emitter platform 16 (FIG. 1) such that the laser beam 18 is emitted in all directions. By increasing the size of the area 91 of FIG. 9, the effective area for receiving photons is increased such that the distance range of data communication may be enhanced.

For an end section 94 of the receiver platform 24, a pie-shaped sector, such as an area 95, may be activated and progress rotationally about an axis of the receiver platform. The peak intensity may be located in the manner described for the area 91. As noted with respect to the exemplary area 91, other activation sequences and configurations of the area 95 may be contemplated, without limitation. Once peak intensities have been located, the results for the areas 91 and 95 may be coordinated to better refine the direction of a source. For example, a stronger peak intensity from the end section 94 than from the area 91 may indicate that rotation or reorientation of the receiver platform 24 is necessary to obtain the strongest signal. Generally, reorientation is performed to provide the maximum number of photo-receptors aligned with the beam source.

Figure 10:
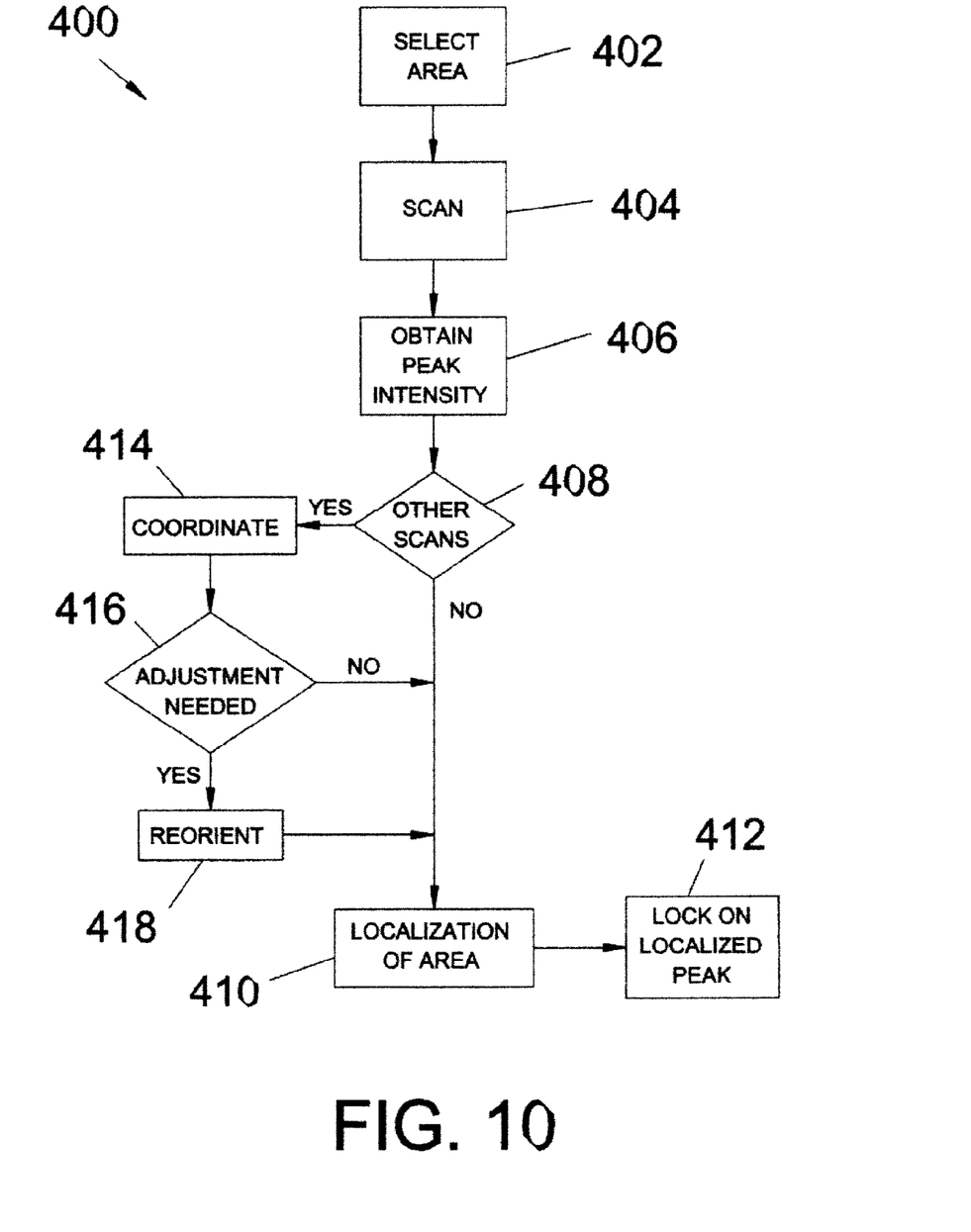
FIG. 10 is a block diagram illustrating a method for determining a direction of a signal source.

FIG. 10 is a block diagram illustrating a method 400 for determining a direction of a signal source. An area of photo-receptors is selected for activation at block 402. At block 404, a scanning sequence of the selected area over the total platform is performed. The scanning sequence results are used to obtain the peak intensity at block 406, as described with respect to FIG. 4 through FIG. 8.

If no other scanning sequences have been performed, as determined at 408, localization of the selected area is carried out to refine the direction of a signal source (block 410). If the results of other scanning sequences are available, the results of all scanning sequences are coordinated (block 414) to determine if an adjustment in orientation of the platform (block 416) would enhance the received signal. If not, the method proceeds to localization as at block 410. If so, a reorientation is performed (block 418) prior to proceeding to block 410. Upon refining the direction at block 410, the method locks onto the localized peak (block 412) to maintain the communication channel.

Figure 11:
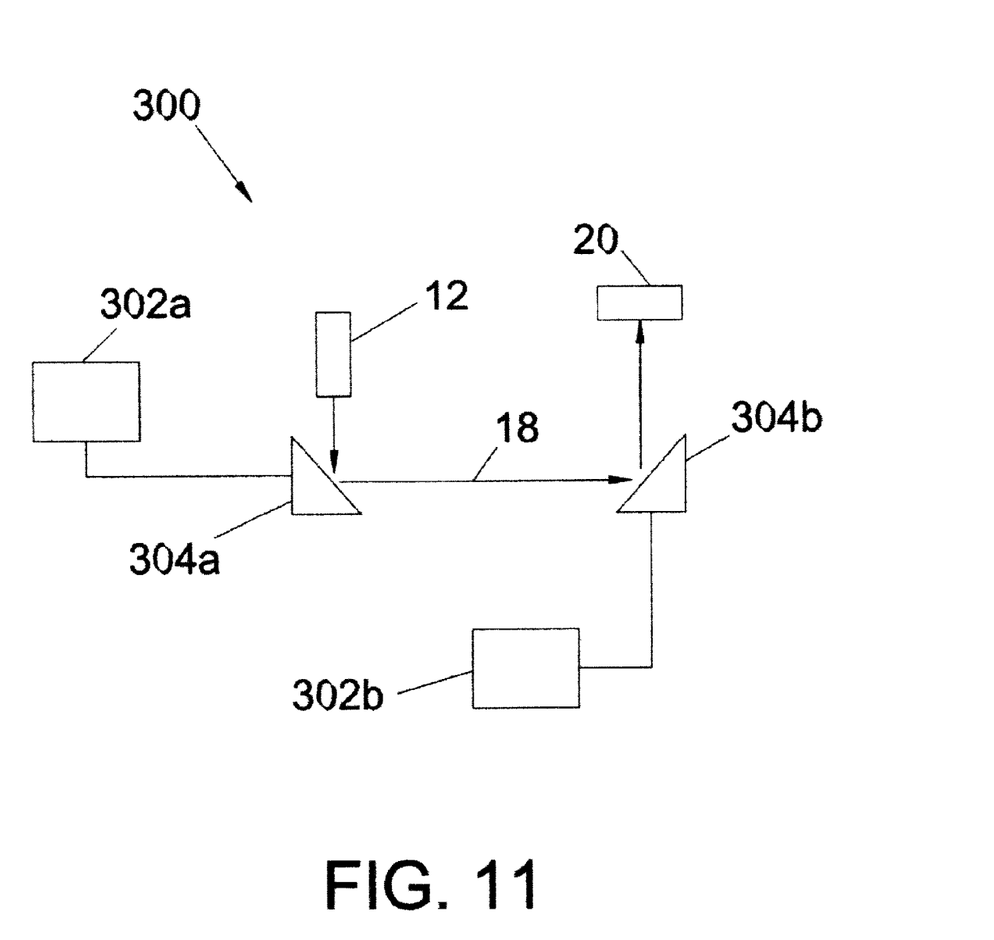
FIG. 11 illustrates a movement compensating means and method.

FIG. 11 illustrates a means 300 for maintaining viable communications by compensating for platform movement in a liquid environment. Platform attitude sensor/controllers 302a and 302b, such as known accelerometers, gyroscopes and compasses, sense movements of their respective platforms. Using closed-loop feedback, sensor/controllers 302a and 302b can control the positioning of respective mirrors 304a and 304b such that the photon beam 18 from the laser source 12 remains aligned with the photo-receptor 20.

Based on current communications technologies, the systems and methods described herein may increase underwater data communication rates by a factor in the range of a thousand. The systems and methods are applicable to both deep ocean and within littoral (100-200 m) depths. While having both the emitter platform 16 and the receiver platform 24 within the ocean environment, the systems and methods are equally applicable to communications between airborne platforms and shallow water submerged platforms. Combined with the enhanced data communication rate, communications with airborne platforms may provide global positioning system capabilities to underwater platforms.

What have thus been described are communication systems and methods for use in underwater environments that provide enhanced data transmission rates. Arrays of nanometer-scaled photon emitters and sensors may be provided on outer surfaces of underwater platforms. The emitters and sensors are lensed to send and receive single photons at precise frequencies. The laser source emitters are pulsed to correlate with data packets. The sensors include a plurality of nano-scale collecting lenses that preferentially absorb photons at the prescribed frequency.

One or more light intensity integrators integrate the received light intensity over given surface areas. The output of the light intensity integrators is fed to one or more intensity-time signal processors to track and process the photonic digital packets arriving at the photo-receptors. Sequenced activation of the emitters provides dispersal of the photons throughout the medium, while sequenced activation of the sensors provides a method for determining the direction of incoming photonic communication.

Obviously many modifications and variations of the present invention may become apparent in light of the above teachings. For example: resonant cavities can be used to increase efficiency of photo-detector signal. Wires connecting the nano-scale photo-receptors may be nano-manufactured placing a few atoms of copper, gold, or such conductors therein. Existing commercial off-the-shelf (COTS) technologies may be combined with nano-tech receiving sensors, such as for the integrators and signal processors. The emitters may also employ non-nanotech coherent lasers, such as solid state lasers may be used. In addition, current digital communication software may be ported for use in signal processing.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A photo-receptor to collect electromagnetic radiation of a predetermined frequency, said photo-receptor comprising:
    a collecting lens formed from plurality of a carbon nano-tubes with each of said nano-tubes parallel to another of said nano-tubes with said nano-tubes arranged to collect the electromagnetic radiation in a direction in parallel alignment with a longitudinal axis of said collecting lens;
    a coating on an interior surface of each of said carbon nano-tubes to absorb the collected electromagnetic radiation; and
    a nano-scale photo-receptor spaced apart from said collecting lens at a distance corresponding to a focal plane for the collected electromagnetic radiation, said photo-receptor including at least one sensing molecule wherein said sensing molecule is selectable to emit at least one electron upon absorbing the collected electromagnetic radiation.

2. The photo-receptor of claim 1, further comprising a plurality of nano-wires capable of transmitting the at least one electron to an integrator for integrating intensities of the electromagnetic radiation collected by said photo-receptor.

3. The photo-receptor of claim 1, further comprising a first protective coating covering said collecting lens in a plane perpendicular to said longitudinal axis such that the electromagnetic radiation passes through said first protective coating prior to entering said collecting lens.

4. The photo-receptor of claim 3, wherein said protective coating is transparent to the electromagnetic radiation.

5. The photo-receptor of claim 4, further comprising a second protective coating for covering a rear surface of said photo-receptor remote from said first protective coating.

* * * * *